(12) United States Patent
Kramer

(10) Patent No.: US 11,103,048 B2
(45) Date of Patent: Aug. 31, 2021

(54) COSMETIC MIRROR ASSEMBLY HAVING MULTIPLE MAGNIFICATION STRENGTHS

(71) Applicant: Dorothy L. Kramer, Naples, FL (US)

(72) Inventor: Dorothy L. Kramer, Naples, FL (US)

(*) Notice: Subject to any disclaimer, the term of this patent is extended or adjusted under 35 U.S.C. 154(b) by 151 days.

(21) Appl. No.: 16/549,581

(22) Filed: Aug. 23, 2019

(65) Prior Publication Data
US 2021/0177123 A1 Jun. 17, 2021

(51) Int. Cl.
*A45D 42/04* (2006.01)
*A47G 1/04* (2006.01)
*G02B 7/198* (2021.01)
*A47G 1/00* (2006.01)

(52) U.S. Cl.
CPC ............ *A45D 42/04* (2013.01); *A47G 1/04* (2013.01); *G02B 7/198* (2013.01); *A47G 2001/002* (2013.01)

(58) Field of Classification Search
CPC ........ A45D 42/00; A45D 42/02; A45D 42/04; A47G 1/04; A47G 2001/002; G02B 7/198
USPC .......................... 359/840, 850, 854, 855, 865
See application file for complete search history.

(56) References Cited

U.S. PATENT DOCUMENTS

| | | | |
|---|---|---|---|
| 518,382 A * | 4/1894 | Wiederer | |
| 1,088,764 A * | 3/1914 | Booth | B60R 1/081 359/854 |
| 1,525,665 A * | 2/1925 | Slover | A45D 33/26 132/287 |
| 1,527,052 A | 2/1925 | McAndrews | |
| 1,685,908 A * | 10/1928 | Coryell | A45D 33/006 132/295 |
| 1,784,034 A | 2/1930 | Blackman | |
| 1,841,933 A * | 1/1932 | Bowers | A45D 33/006 132/296 |
| 1,991,054 A | 2/1935 | Hampke | |
| 2,062,363 A | 12/1936 | Kreisler | |
| 2,124,146 A * | 7/1938 | Elizabeth | A45D 42/00 359/851 |
| 2,571,485 A * | 10/1951 | Reiskin | A45D 33/008 132/300 |
| 3,751,140 A * | 8/1973 | Berlin | G02B 5/10 359/840 |
| 4,050,790 A | 9/1977 | Jorwa | |
| 4,119,107 A * | 10/1978 | Pinzone | A45C 5/00 132/316 |
| 4,639,102 A | 1/1987 | Fetko et al. | |
| 5,337,890 A | 8/1994 | Lai | |
| 5,430,578 A * | 7/1995 | Reagan | A47G 1/04 359/855 |
| 5,625,501 A | 4/1997 | Taggert | |
| 6,637,139 B1 | 10/2003 | Chan | |
| 7,146,184 B1 | 12/2006 | Tsitsiashvili | |
| D552,851 S * | 10/2007 | Abrahamian | D6/301 |

(Continued)

*Primary Examiner* — Ricky D Shafer
(74) *Attorney, Agent, or Firm* — Edward M. Livingston, Esq.; Luca L. Hickman, Esq.; Henderson, Franklin, Starnes & Holt, P.A.

(57) ABSTRACT

A portable mirror assembly (1) having a plurality of mirrors (8), each of which has an increasing level of magnification. The mirrors are preferably connected via one or more hinges (6) and/or pivot points (9) that allow the plurality of mirrors to be folded out into an open position and into a desired configuration revealing the particular mirror or mirrors an individual desires to use for a specific application.

7 Claims, 4 Drawing Sheets

(56) References Cited

U.S. PATENT DOCUMENTS

| | | | |
|---|---|---|---|
| 7,347,573 B1 | | 3/2008 | Isler |
| 7,556,384 B2 | | 7/2009 | Chan |
| 8,651,676 B2 | | 2/2014 | Nottage |
| 9,565,921 B1 | | 2/2017 | Friedman et al. |
| D865,374 S | * | 11/2019 | Yang ............................. D6/310 |
| 2003/0150470 A1 | | 8/2003 | Phue |
| 2004/0008434 A1 | * | 1/2004 | Yang ....................... G02B 5/08 |
| | | | 359/872 |
| 2008/0080075 A1 | | 4/2008 | Kawai |
| 2009/0052072 A1 | | 2/2009 | Egosi |

* cited by examiner

COSMETIC MIRROR ASSEMBLY HAVING MULTIPLE MAGNIFICATION STRENGTHS

FIELD OF THE INVENTION

This invention relates generally to portable mirrors used for applying cosmetics and more particularly to a portable mirror assembly having a plurality of mirrors each of which provides a unique magnification strength.

BACKGROUND OF THE INVENTION

Individuals, especially females, require a magnified mirror to apply makeup and/or tend to other grooming tasks, such as plucking eyebrows and so forth. Each of these tasks requires a clear and detailed mirrored reflection of the face to allow an individual to accomplish his or her task. Thus, many individuals possess large cosmetic mirrors that are kept at home and mounted on a wall or placed on a pedestal on a counter.

However, individuals who travel or are away from home are often without access to a mirror that provides magnification. For example, conventional wall mirrors found in bathrooms of hotels, restaurants and offices only provide a (1×) magnification strength. Likewise, conventional compact mirrors and makeup cases only provide a single mirror having (1×) magnification strength and possibly a single second mirror having a stronger magnification to reflect a more detailed image, which is still very limiting.

Ideally, an individual should have access to more than one magnification strength to facilitate efficient and detailed makeup application and/or grooming.

Therefore, a need exists for a portable mirror assembly having a plurality of mirrors each of which provides a unique magnification strength.

SUMMARY OF THE INVENTION

The primary object of the present invention is to provide a portable mirror assembly having a plurality of mirrors each of which provides a unique magnification strength.

The present invention fulfills the above and other objects by providing a portable mirror assembly having a plurality of mirrors, each of which has an increasing level of magnification. For example, a first mirror may have a normal (1×) magnification, a second mirror may have three times (3×) magnification, a third mirror may have a seven time (7×) magnification and a fourth mirror may have a twenty time (20×) magnification. The four mirrors are preferably connected via one or more hinges and/or pivot points that allow the plurality of mirrors to be folded out into an open position and into a desired configuration, thereby revealing the particular mirror or mirrors and corresponding magnification strengths an individual desires to use for a specific application.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
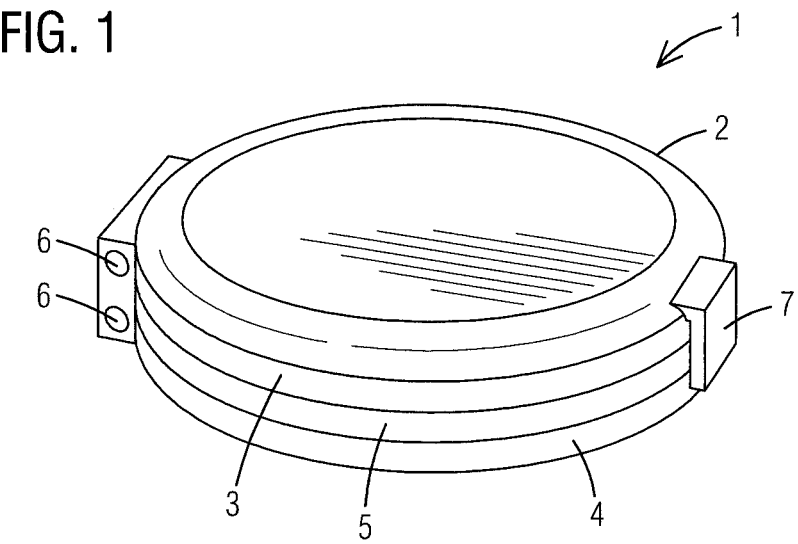
FIG. 1 is a perspective side view of a portable mirror assembly of the present invention in a closed position.
Figure 2:
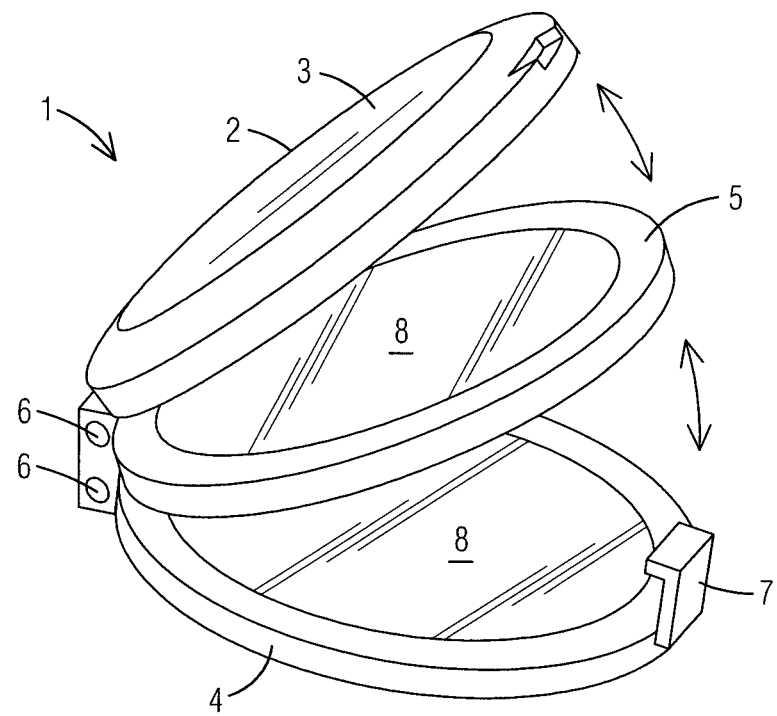
FIG. 2 is a perspective side view of a portable mirror assembly of the present invention in a partially open position.

For purposes of describing the preferred embodiment, the terminology used in reference to the numbered accessories in the drawings is as follows:
 1. portable mirror assembly, generally
 2. housing
 3. first side casing
 4. second side casing
 5. middle casing
 6. hinge
 6A. first hinge
 6B. second hinge
 6C. third hinge
 7. lock
 8. mirror
 8A. first mirror
 8B. second mirror
 8C. third mirror
 8D. fourth mirror
 9. pivot point With reference to FIGS. 1 and 2, perspective side views of a portable mirror assembly 1 of the present invention in a closed position and in a partially open position, respectively, are illustrated. The portable mirror assembly 1 comprises a housing 2 having a first side casing 3, a second side casing 4 and at least one middle casing 5 wherein said first side casing 3, said second side casing 4 and said at least one middle casing 5 are hingedly attached to each via at least one hinge 6 other to allow the housing to be opened and closed. A lock 7 or similar clasp is preferably located on the housing 2 to maintain the housing 2 in a closed position, as illustrated in FIG. 1. When the housing 2 is opened, said at least one middle casing 5 is exposed, as illustrated in FIG. 2, thereby exposing mirrors 8 held within the first side casing 3, said second side casing 4 and said at least one middle casing 5

Figure 3:
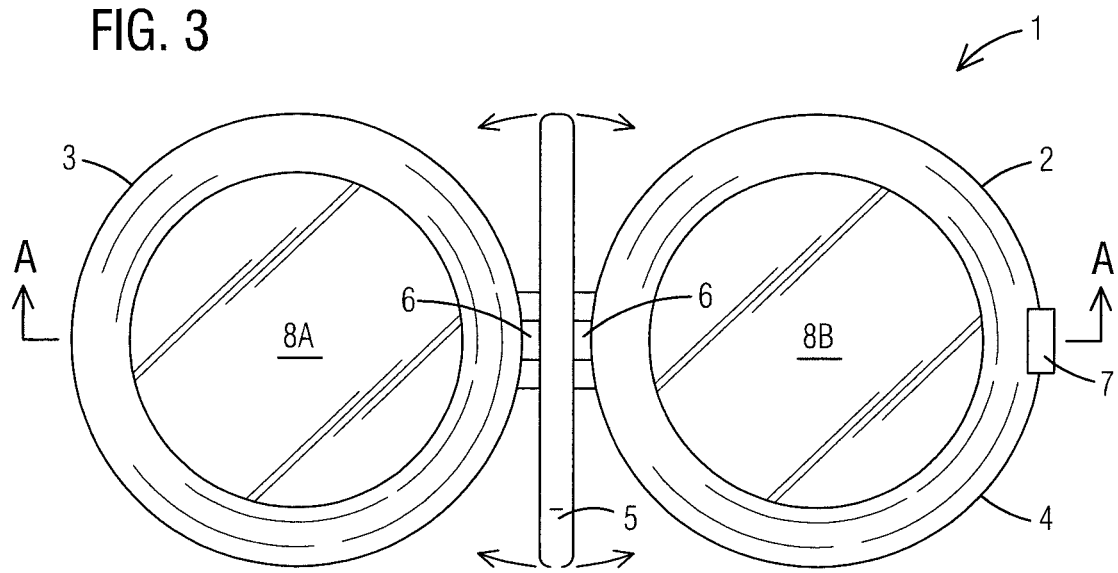
FIG. 3 is a top view of the portable mirror assembly of the present invention in an open position.
Figure 4:
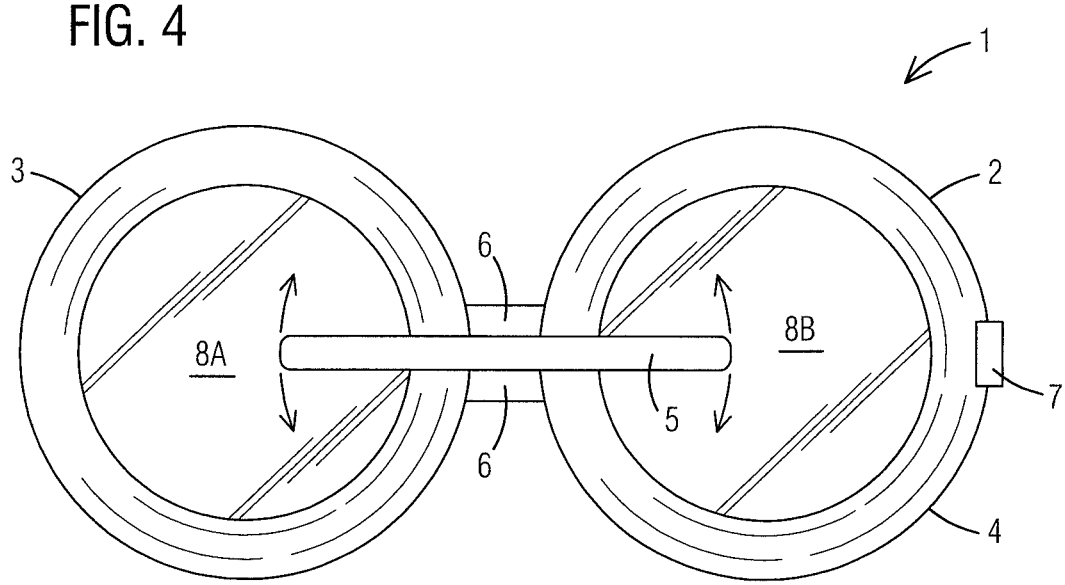
FIG. 4 is a top view of the portable mirror assembly of the present invention in an open position wherein the middle casing is being rotated in relation to the first side casing and the second side casing.

With reference to FIGS. 3 and 4, top views of the portable mirror assembly of the present invention in an open position and a middle casing 5 being rotated while a first side casing 3 and a second side casing 4 remain in stationary positions are illustrated. The portable mirror assembly 1 comprises a housing 2 having a first side casing 3, a second side casing 4 and at least one middle casing 5 wherein said first side casing 3, said second side casing 4 and said at least one middle casing 5 are hingedly attached to each via at least one hinge 6 other to allow the housing to be opened and closed. A lock 7 or similar clasp is preferably located on the housing 2 to maintain the housing 2 in a closed position.

Figure 5:
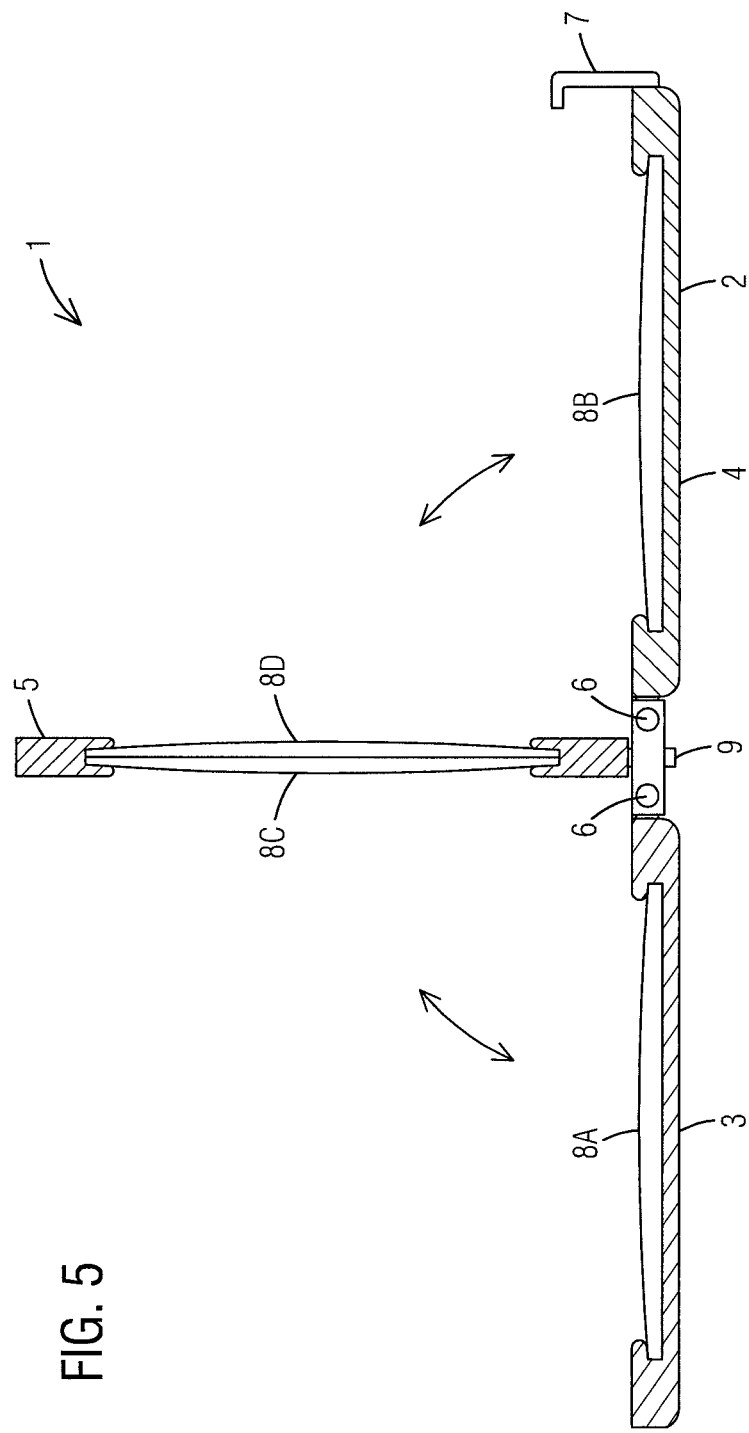
FIG. 5 is a cross sectional view along lines A-A of FIG. 3.

The middle casing 5 is preferably rotatable within said portable mirror assembly 1 and attached via at least one pivot point 9, as illustrated in FIG. 5, that allows a user to position mirrors 8 located on the middle casing 5 to face the mirrors 8 located on the first side casing 3 and the second side casing 4.

With reference to FIG. 5, a cross sectional view along lines A-A of FIG. 3 is illustrated. The housing 2 is opened, a first mirror 8A located in the first side casing 3 and a second mirror 8B located in the second side casing 4 are exposed. A third mirror 8C and a fourth mirror 8D are located on opposing sides of the middle casing 5. Said first mirror 8A, said second mirror 8B, said third mirror 8C and said fourth mirror 8D each having a unique magnification strength.

The middle casing 5 is preferably rotatable within said portable mirror assembly 1 and attached via at least one pivot point 9 that allows a user to position mirrors 8C and 8D located on the middle casing 5 to face the first mirror 8A located on the first side casing 3 and the second mirror 8B located on the second side casing 4.

Figure 6:
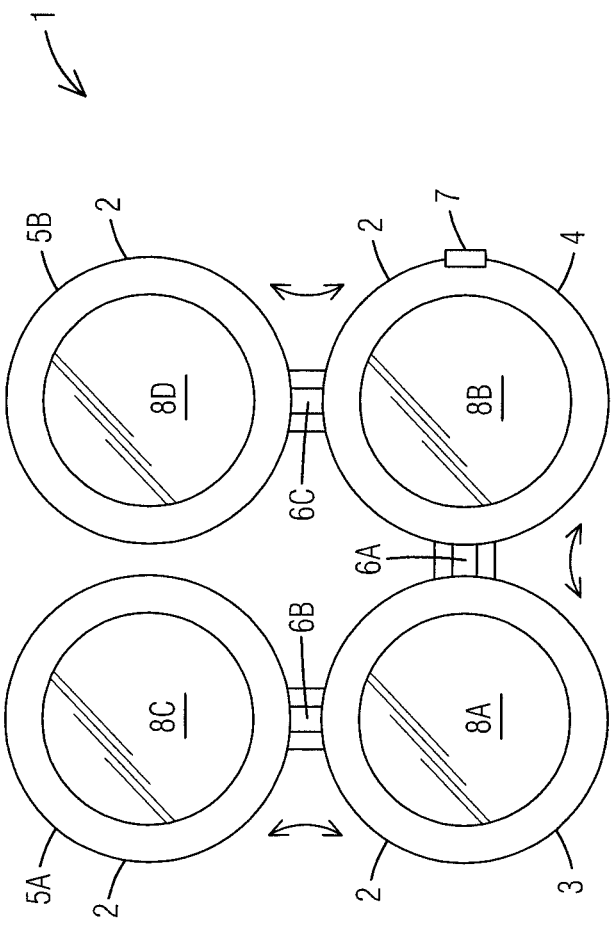
FIG. 6 is a top view of a portable mirror assembly of the present invention wherein middle casings are hingedly attached to the first side casing and the second side casing.

With reference to FIG. 6, a top view of a portable mirror assembly 1 of the present invention wherein middle casings 5 are hingedly attached to the first side casing 3 and the second side casing 4, respectively, is illustrated. The portable mirror assembly 1 comprises a housing 2 having a first side casing 3, a second side casing 4 and at least one middle casing 5 wherein said first side casing 3 and said second side casing 4 are hingedly attached to each via a first hinge 6A to allow the housing 2 to be opened and closed. A lock 7 or similar clasp is preferably located on the housing 2 to maintain the housing 2 in a closed position, as illustrated in FIG. 1. When the housing 2 is opened, at least one middle casing 5 is exposed.

As illustrated herein, a first middle casing 5A is attached to the first side casing 2 via a second hinge 6B. A second middle casing 5B is attached to the second side casing 3 via a third hinge 6C.

The portable mirror assembly 1 may be folded out into an open U-shaped configuration exposing four mirrors 8 contained therein. A first mirror 8A is located in the first side casing 3, a second mirror 8B is located in the second side casing 4, a third mirror 8C is located in the first middle casing 5A and a fourth mirror 8D is located in the second middle casing 5B. Said first mirror 8A, said second mirror 8B, said third mirror 8C and said fourth mirror 8D each have a unique magnification strength.

Figure 7:
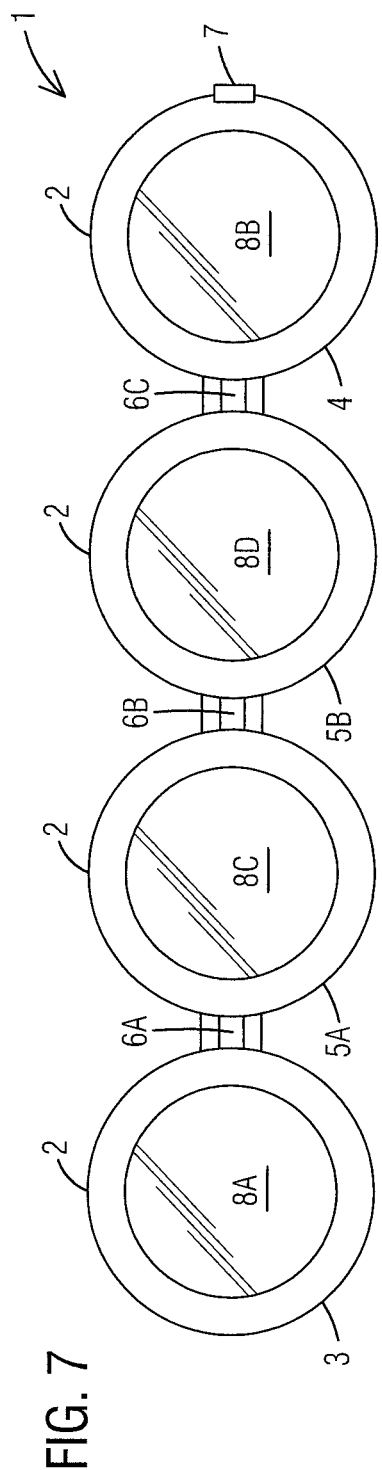
FIG. 7 is a top view of a portable mirror assembly of the present invention wherein middle casings are hingedly attached to each other.

With reference to FIG. 7, a top view of a portable mirror assembly 1 of the present invention wherein middle casings 5 are hingedly attached to each other is illustrated. The portable mirror assembly 1 comprises a housing 2 having a first side casing 3, a second side casing 4 and at least one middle casing 5 hingedly attached to each via hinges 6 to allow the housing 2 to be opened and closed. A lock 7 or similar clasp is preferably located on the housing 2 to maintain the housing 2 in a closed position, as illustrated in FIG. 1. When the housing 2 is opened, at least one middle casing 5 is exposed.

As illustrated herein, a first middle casing 5A is attached to the first side casing 2 via a first hinge 6A. A second middle casing 5B is attached to the first middle casing 5A via a second hinge 6B. The second middle casing 5B is attached to the second outer casing 3 via a third hinge 6C.

The portable mirror assembly 1 may be folded out into an open accordion configuration exposing four mirrors 8 contained therein. A first mirror 8A is located in the first side casing 3, a second mirror 8B is located in the second side casing 4, a third mirror 8C is located in the first middle casing 5A and a fourth mirror 8D is located in the second middle casing 5B. Said first mirror 8A, said second mirror 8B, said third mirror 8C and said fourth mirror 8D each have a unique magnification strength.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A portable mirror assembly comprising:
   a housing having a first side casing, a second side casing and at least one middle casing wherein said first side casing, said second side casing and said at least one middle casing are hingedly attached to each other via at least one hinge to allow the housing to be opened and closed;
   a first mirror located in the first side casing;
   a second mirror located in the second side casing; and
   a third mirror and a fourth mirror located on opposing sides of the at least one middle casing.

2. The portable mirror assembly of claim 1 wherein:
   said first mirror, said second mirror, said third mirror and said fourth mirror each having a unique magnification strength.

3. The portable mirror assembly of claim 2 further comprising:
   a lock located on the housing to maintain the housing in a closed position.

4. The portable mirror assembly of claim 1 wherein:
   said at least one middle casing being attached to the portable mirror assembly via at least one pivot point that allows the at least one middle casing to be rotated in relation to the first side casing and the second side casing.

5. The portable mirror assembly of claim 4 wherein:
   said first mirror, said second mirror, said third mirror and said fourth mirror each having a unique magnification strength.

6. The portable mirror assembly of claim 1 further comprising:
   a lock located on the housing to maintain the housing in a closed position.

7. The portable mirror assembly of claim 4 further comprising:
   a lock located on the housing to maintain the housing in a closed position.

* * * * *